Nov. 15, 1932.  F. C. BERRY  1,887,537
HAY PRESS
Filed Feb. 21, 1931
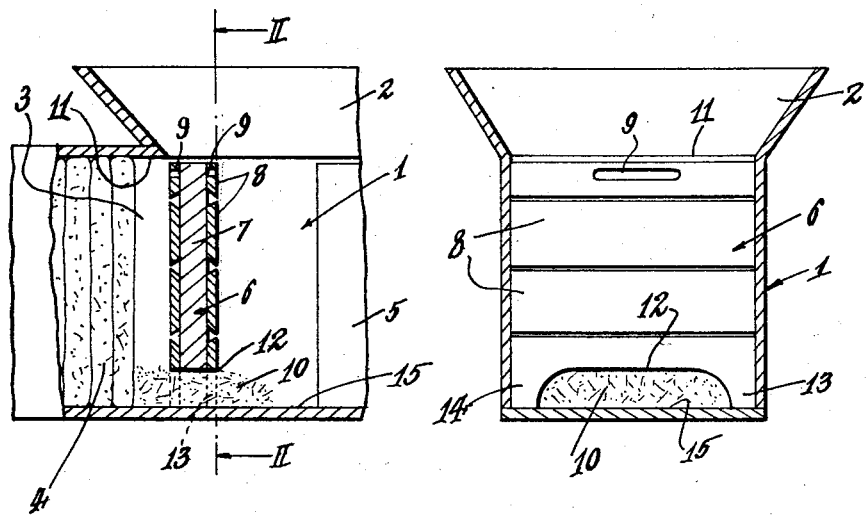
Fig. 1.   Fig. 2.
Fig. 3.
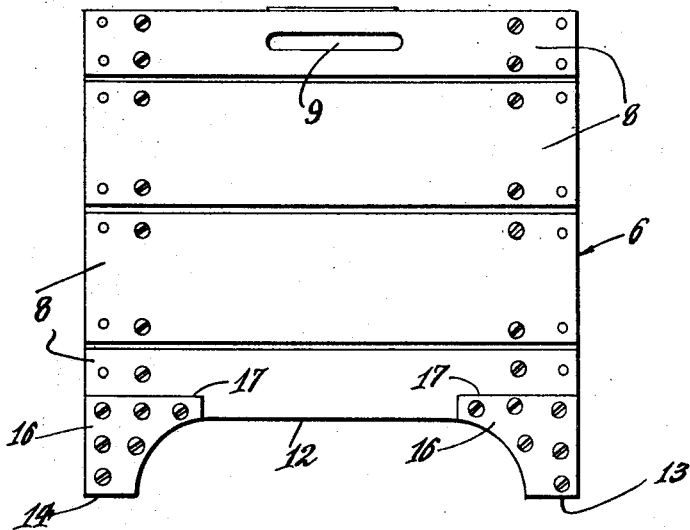
Inventor
Frank C. Berry
By Lyon & Lyon
Attorneys Patented Nov. 15, 1932

1,887,537

UNITED STATES PATENT OFFICE

FRANK C. BERRY, OF DOWNEY, CALIFORNIA

HAY PRESS

Application filed February 21, 1931. Serial No. 517,401.

My invention relates to hay presses and has particular reference to a baler block or division block employed in the hay press in the formation of bales of hay, straw and similar material.

In the operation of a baling press for hay, straw and the like, loose particles of hay and straw forming on the floor of the baler tend to twist the division block and to lift the same out of its proper position relative to the press.

It is an object of the invention to provide a division block for baling presses in which loose particles of the material to be pressed will be prevented from lifting or twisting the division block.

Other objects will be apparent from a study of the following specification, taken in connection with the accompanying drawing, wherein Figure 1 is a sectional view through a baling press illustrating my improved division block;

Figure 2 is a sectional view through the baling press taken along the line II—II, of Figure 1; and Figure 3 is a front elevational view of the baler block constructed in accordance with my invention.

Referring to the drawing, I have illustrated, in Figure 1, the baler press 1 comprising a hopper 2, a press chamber 3, in which hay or similar material 4 is to be pressed into bales or sections to form the completed bale of pressed material.

The baler press is provided with a plunger 5 adapted to engage and press a division block 6 against the material 4 which is to be pressed into the bale. The division block 6, when inserted in place in the press, substantially fills the cross sectional area of the pressing chamber 3 and when the plunger 5 is moved to the left to compress the hay, the block 6 is moved into and through the pressing chamber 3.

The division block 6 is illustrated as being constructed of a main body 7 of substantially the same size and configuration as the cross section of the interior of the press chamber 3, being reinforced upon its front and rear sides as by means of cross bars 8, formed of wood, or other suitable material, the grain of which runs crosswise of the grain of the main body 7 so as to insure adequate strength in the finished baler block.

If desired, a plurality of slots or grips 9 may be provided to facilitate the handling of the division block and its insertion and removal from the baler 1.

As is illustrated in Figure 1, particles of loose hay or other material to be baled are illustrated at 10 as having accumulated in the base of the baler 1 so that the division block 6 would be prevented from being properly fitted in the chamber 3 and would be held upwardly in such position that its upper end would project outwardly above the line of the top wall 11 of the chamber 3, so that when the plunger 5 moves to the left the block 6 would strike the edge of the top wall 11 and be broken, or would break other parts of the baler. However, this condition may be obviated by providing an opening 12 in the lower side of the division block 6, as is illustrated in Figures 2 and 3.

In the form of my invention illustrated, the opening 12 constitutes a cut-away portion of the block to form a relatively low arch extending substantially throughout the width of the division block 6, the portions which are not cut away constituting legs 13 and 14 which extend into contact with the lower surface or floor 15 of the compressing chamber 3. If desired, the projecting legs 13 and 14 may be strengthened, as is illustrated in Figure 3, by reinforcing the same with braces 16 formed from plates of relatively heavy metal which may be inserted or inlaid in suitable recesses 17 formed upon the lower side of the division block 6.

The operation of my device is as follows: A quantity of hay or other material to be compressed into a bale, is placed into the hopper 2 and permitted to fall into the receiving chamber or the open space in the compressor chamber 3 lying to the right of the lower edge of the hopper 2. Sufficient material to form a bale is placed therein and the plunger 5 is then moved to the left to compress this material into a bale. The plunger 5 is then withdrawn and a division block 6 is inserted as is indicated in Figure 1. Then fresh material may be placed in the receiving chamber ready to form the new bale. The next movement of the plunger 5 to the left compresses this material and presses the division block 6 into and through the compressing chamber 3.

It will be observed that any loose material which was left upon the floor of the baler 1 in compressing the first charge, will be accumulated upon the next movement of the plunger 5 in the space 12 provided by the cutting away of the lower side of the division block 6, the amount of space provided by cutting away this portion of the division block being sufficient to accommodate that material which would ordinarily accumulate in the compression of the previous bale of compressed material.

It will, of course, be understood that the space between the reinforcing blocks 8 on the division block 6 will permit of the insertion therethrough of the necessary tie-wires to permit tying the finished bale in the usual manner.

It will thus be observed that I have provided a division block for a baling press which may be readily inserted in the baler without the necessity of removing accumulated fine material and which provides the necessary steps to accommodate such fine material to prevent it from either forcing the lower end of the division block out of vertical alignment, or of accumulating on the lower side of the finished series of bales and thus deforming the finished bales of material.

While I have described the preferred embodiment of my invention, it is to be understood that I do not desire to be limited to any of the details shown or described herein, except as defined in the appended claim.

I claim:

In a division-block for a baler press, a body portion having substantially the size and configuration of the compressing chamber to which it is to be applied and provided upon its lower edge with an inwardly projecting arched opening extending through the major portion of the length of said edge to permit fine particles of the baled material to pass through the block.

Signed at Los Angeles, California, this 4th day of February, 1931.

FRANK C. BERRY.